July 28, 1953
E. A. ROHR
2,646,739
VINE CUTTER
Filed Nov. 21, 1950
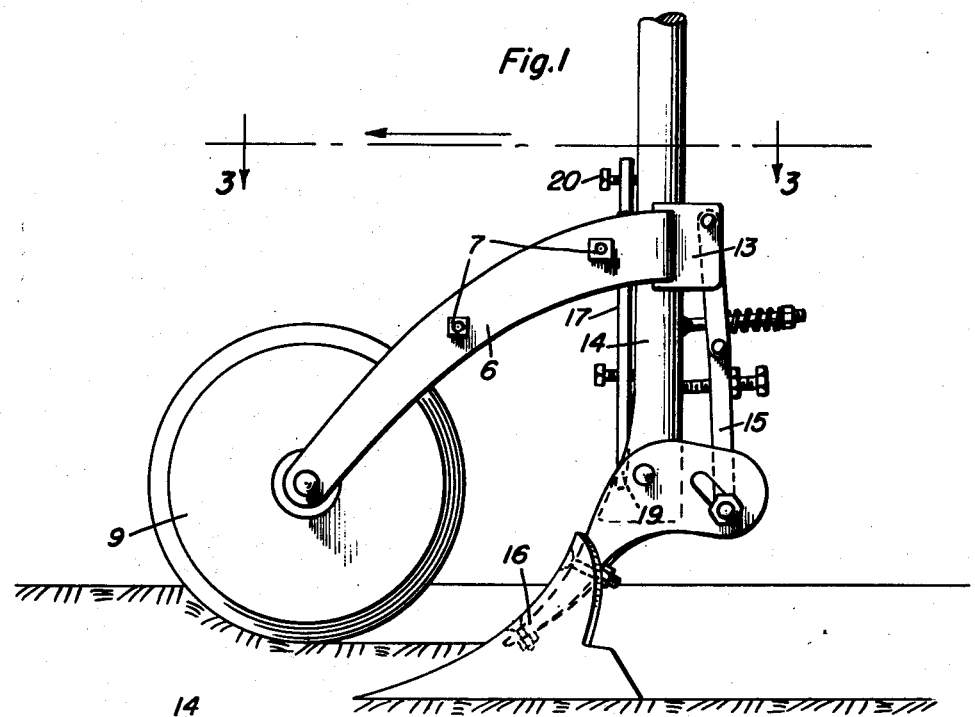
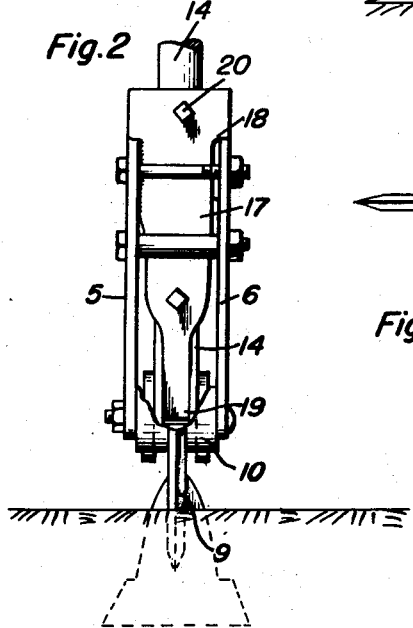
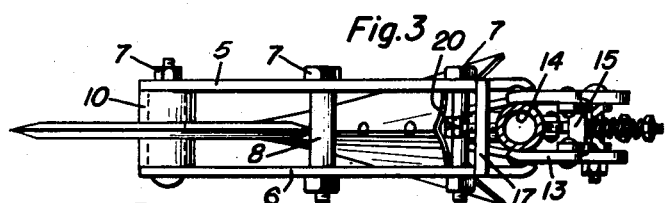
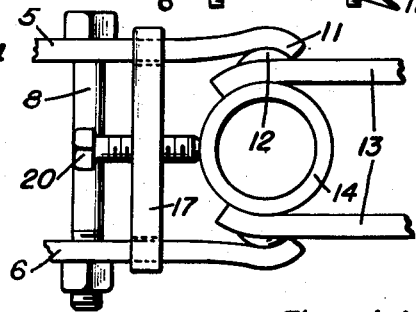
Elwood A. Rohr
INVENTOR.
BY *Clarence A. O'Brien*
*and Harvey B. Jackson*
Attorneys Patented July 28, 1953

2,646,739

UNITED STATES PATENT OFFICE 2,646,739

VINE CUTTER

Elwood A. Rohr, Montezuma, Ind.

Application November 21, 1950, Serial No. 196,839

2 Claims. (Cl. 97—209)

The present invention relates to new and useful improvements in vine cutters adapted for attaching to cultivators or plows to cut vines in the path of the implements to avoid entanglement and intereference of the growing vines therewith.

An important object of the invention is to provide a vine cutting attachment which may be easily and quickly attached in adjusted position on the shovel shank of a cultivator without necessitating any changes or alterations in the construction thereof.

A still further object is to provide a device of this character of simple and practical construction, which is efficient and reliable in operation and strong and durable, relatively inexpensive to manufacture and otherwise well adapted for the purposes for which the same is intended.

Other objects and advantages reside in the details of construction and operation as more fully hereinatfer described and claimed, reference being had to the accompanying drawings forming a part hereof, wherein like numerals refer to like parts throughout, and in which:

Figure 1 is a side elevational view;

Figure 2 is a front elevational view;

Figure 3 is a top plan view taken on the line indicated 3—3 of Figure 1; and

Figure 4 is an enlarged fragmentary top plan view of the upper end of the clamping arms for the cutter.

Referring now to the drawings in detail wherein for the purpose of illustration I have disclosed a preferred embodiment of the invention, the numerals 5 and 6 designate a pair of supporting arms secured to each other in spaced apart relation by bolts and nuts 7 and with spacing collars or sleeves 8 on the bolts between the arms.

A cutting disk 9 is rotatably supported on one of the bolts at the lower ends of the arms and held centered between the arms by spacing collars or washers 10 at each side of the cutter.

The upper ends of the arms are formed with recesses 11 at their opposed faces to engage the rivet heads 12 used for securing a pair of attaching plates 13 to the side of a cultivator shovel shank 14, the attaching plates having the upper ends of the shovel adjusting arms 15 atttached thereto. The rear ends of the arms 5 and 6 are clamped against the rivet heads 12 at the opposite sides of the shovel shank 14 by means of the bolts and nuts 7, to support the cutter in front of a cultivator shovel 16 at the lower end of shank 14.

A T-shaped plate 17 is positioned vertically between the arms 5 and 6 and is welded at one side edge to one of the arms and spaced from the other of said arms and with the shoulders 18 of the plate resting on the upper edges of the arms. The lower end of plate 17 is positioned in a vertical groove or recess 19 in the front lower portion of shank 14 to align the cutter 9 with the shovel 16 and to prevent twisting of the cutter. Set screws 20 are carried by the plate 17 and engage the shank 14 to also hold the plate in position and to prevent loosening of the arms on the rivets 12 due to pressure subjected to the cutter and arms by the vines.

In the operation of the device, the arms 5 and 6, having the cutter 9 at their front ends, are easily and quickly clamped to the rivet heads 12 of shank 14, and plate 17 holds the cutter aligned with the cultivator shovel to cut vines and other vegetation in the path of the shovel.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. In a vine cutting attachment for the shank of a cultivator plow, a pair of cutter supporting arms, means securing the arms to each other in spaced apart relation and in clamping position at opposite sides of the shank, an elongated plate positioned between the arms and having shoulders overlying the arms, and means securing the plate in a vertical position to the shank and in front thereof to hold a cutter supported by the arms aligned with the plow.

2. In a vine cutting attachment for the shank of a cultivator plow, a pair of cutter supporting arms, means securing the arms to each other in spaced apart relation in clamping position at opposite sides of the shank, and a vertical plate attached to one of the arms and positioned in front of the shank, said shank having a recess receiving the plate to align a cutter supported by the arms with the plow.

ELWOOD A. ROHR.

References Cited in the file of this patent

UNITED STATES PATENTS

| Number | Name | Date |
|---|---|---|
| 2,168,004 | Strandlund | Aug. 1, 1939 |
| 2,414,175 | Silver | Jan. 14, 1947 |